United States Patent
Hauleitner et al.

(10) Patent No.: US 11,493,242 B2
(45) Date of Patent: Nov. 8, 2022

(54) COOLING SYSTEM FOR A REFRIGERANT LUBRICATED BEARING ASSEMBLY

(71) Applicant: Aktiebolaget SKF, Gothenburg (SE)

(72) Inventors: Rudolf Hauleitner, Steyr (AT); Christine Matta, Utrecht (NL); Guillermo Enrique Morales Espejel, Ijsselstein (NL); Hans Wallin, Cape Coral, FL (US)

(73) Assignee: AKTIEBOLAGET SKF (SE)

( * ) Notice: Subject to any disclaimer, the term of this patent is extended or adjusted under 35 U.S.C. 154(b) by 136 days.

(21) Appl. No.: 16/685,704

(22) Filed: Nov. 15, 2019

(65) Prior Publication Data

US 2020/0166249 A1    May 28, 2020

Related U.S. Application Data

(60) Provisional application No. 62/771,625, filed on Nov. 27, 2018.

(51) Int. Cl.
| | |
|---|---|
| *F25B 31/00* | (2006.01) |
| *F25B 41/42* | (2021.01) |
| *F16C 37/00* | (2006.01) |
| *F25B 1/02* | (2006.01) |

(52) U.S. Cl.
CPC .......... *F25B 31/002* (2013.01); *F16C 37/007* (2013.01); *F25B 31/004* (2013.01); *F25B 1/02* (2013.01); *F25B 41/42* (2021.01); *F25B 2400/16* (2013.01); *F25B 2500/16* (2013.01)

(58) Field of Classification Search
CPC ................ F25B 31/002; F25B 2400/13; F25B 2500/16; F25B 31/006; F25B 31/008; F25B 41/42; F25B 2400/0411; F25B 2400/16; F16C 37/007
See application file for complete search history.

(56) References Cited

U.S. PATENT DOCUMENTS

| | | | |
|---|---|---|---|
| 5,497,631 A | 3/1996 | Lorentzen et al. | |
| 5,881,564 A * | 3/1999 | Kishimoto | F25B 1/053 62/193 |
| 5,899,091 A * | 5/1999 | Fraser, Jr. | F25B 31/002 62/473 |
| 6,176,092 B1 | 1/2001 | Butterworth et al. | |
| 6,279,340 B1 | 8/2001 | Butterworth et al. | |
| 6,564,560 B2 | 5/2003 | Butterworth et al. | |

(Continued)

FOREIGN PATENT DOCUMENTS

| | | |
|---|---|---|
| EP | 0664424 | 7/1995 |
| GB | 777232 | 6/1957 |

OTHER PUBLICATIONS

Haverkamp et al., "Adsorption of Hydrogen Fluoride on Alumina," Surface and Interface Analysis, vol. 19, pp. 139-144 (1992).

(Continued)

*Primary Examiner* — Jerry-Daryl Fletcher
*Assistant Examiner* — Daniel C Comings
(74) *Attorney, Agent, or Firm* — Reed Smith LLP

(57) ABSTRACT

A cooling system and methods of employing the same includes a refrigerant cycle for cycling refrigerant from a compressor to a condenser and from the condenser an evaporator unit, and a lubrication cycle having at least one lubricating refrigerant supply line for providing refrigerant as lubricant to a bearing assembly.

9 Claims, 2 Drawing Sheets

(56) References Cited

U.S. PATENT DOCUMENTS

| | | |
|---|---|---|
| 6,840,058 B2 | 1/2005 | Suzuki et al. |
| 7,563,739 B2 | 7/2009 | Kilthau et al. |
| 8,104,298 B2* | 1/2012 | Sishtla ................. F04D 29/058 62/84 |
| 9,335,080 B2 | 5/2016 | Ward et al. |
| 9,676,492 B2 | 6/2017 | Tichborne et al. |
| 9,879,164 B2 | 1/2018 | Kujak |
| 2016/0160856 A1 | 6/2016 | Wallin et al. |
| 2016/0160857 A1 | 6/2016 | Wallin et al. |
| 2017/0097007 A1* | 4/2017 | Sishtla ................... F04D 17/08 |
| 2018/0066871 A1 | 3/2018 | Matsukura et al. |
| 2018/0245719 A1 | 8/2018 | Attarwala et al. |
| 2019/0145677 A1 | 5/2019 | Incorvia |
| 2019/0277548 A1* | 9/2019 | Hern ....................... F25B 45/00 |

OTHER PUBLICATIONS

"What is the Reaction of Aluminium with Hydrofluoric Acid?" https://www.quora.com/What-is-the-reaction-of-aluminium-with-hydrofluoric-acid, pp. 1-2.

\* cited by examiner

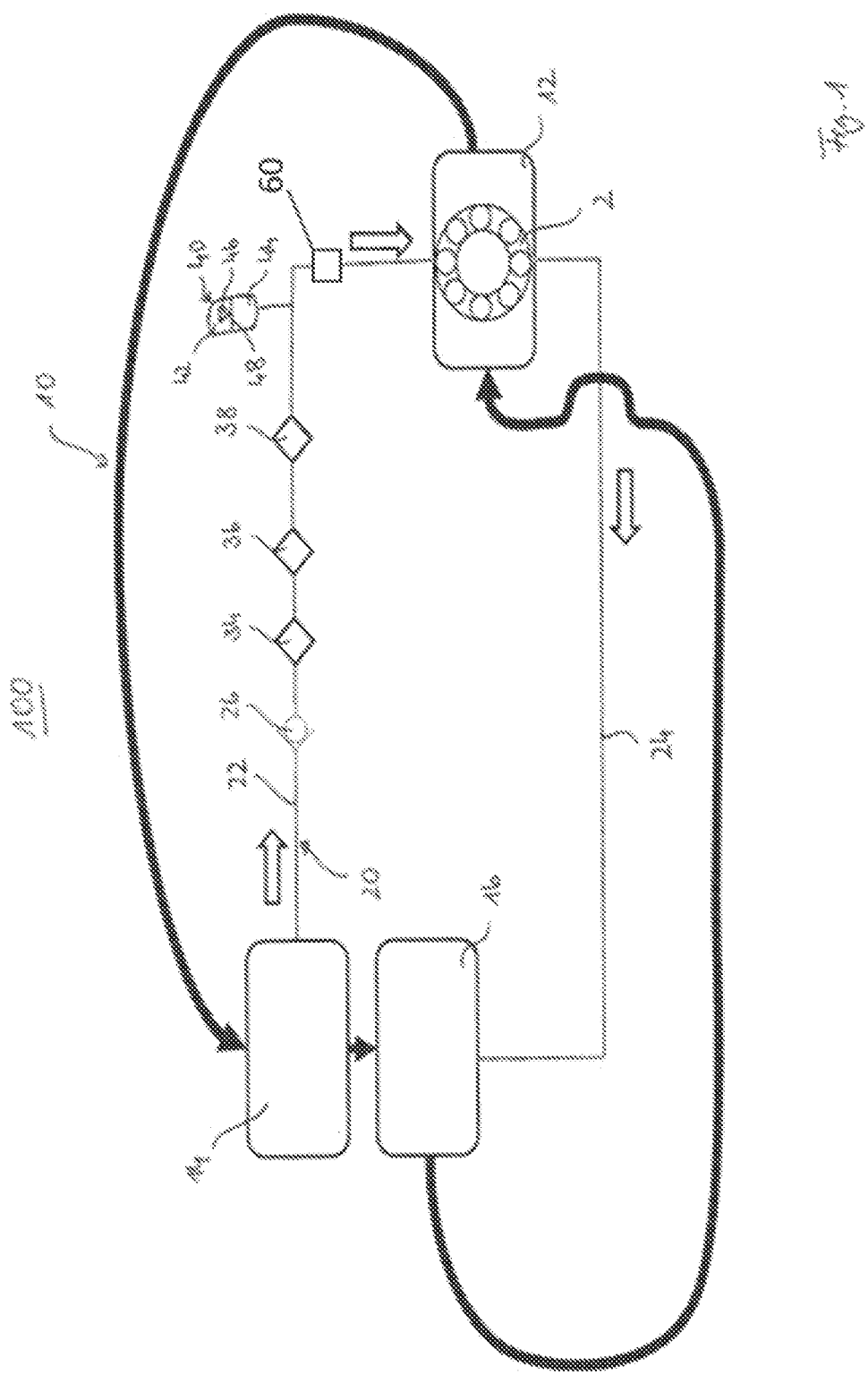

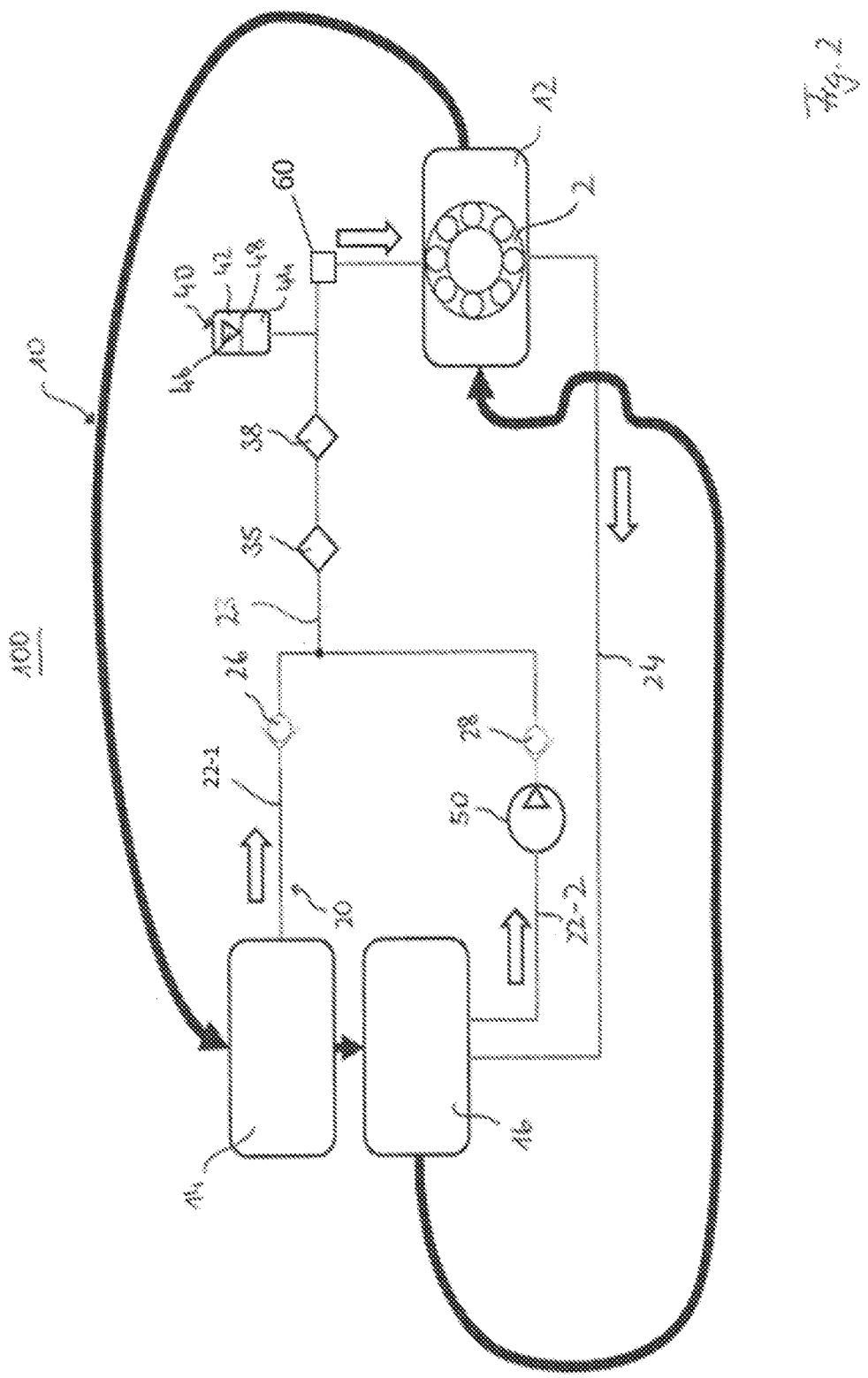

COOLING SYSTEM FOR A REFRIGERANT LUBRICATED BEARING ASSEMBLY

This application claims the benefit under 35 U.S.C. § 119(e) of the earlier filing date of United States Provisional Patent Application No. 62/771,625 filed on Nov. 27, 2018 the disclosure of which is incorporated by reference herein.

FIELD

The present invention relates to cooling systems and to methods for operating such a cooling system.

BACKGROUND

Cooling systems, such as a chiller or air conditioning system, generally include a compressor unit, a condenser unit, an expansion device and an evaporator unit, which are connected into a so-called cooling cycle or refrigerant cycle. In the cooling cycle refrigerant is cycled from at least the compressor unit for compressing gaseous refrigerant to the condenser for condensing gaseous refrigerant to liquid refrigerant, from the condenser unit to the expansion unit for expanding the liquid refrigerant, from the expansion unit to an evaporator unit for evaporating the liquid refrigerant to gaseous refrigerant, and from the evaporating unit back to the compressor unit. Usually, such a cooling system removes heat from a liquid via the vapor-compression refrigerant cycle. The cooled liquid may then be used to cool air (e.g., air conditioning) or in an industrial process.

BRIEF DESCRIPTION OF THE DRAWINGS

FIG. 1 illustrates a schematic drawing of aspects of an exemplary cooling system in accordance with this disclosure, and FIG. 2 illustrates a schematic drawing of aspects of an exemplary cooling system in accordance with this disclosure.

DETAILED DESCRIPTION

Disclosed are one or more preferred embodiments that incorporate features of this invention. The disclosed embodiment(s) merely exemplify the invention. The scope of the invention is not limited to the disclosed embodiments. Rather, the invention is defined by the claims hereto.

FIGS. 1 and 2 illustration aspects of an exemplary cooling system 100 having a cooling cycle 10 (indicated by thick arrows) and a lubrication cycle 20 (indicated by hollow arrows), wherein the lubrication cycle 20 also comprises refrigerant as lubricant.

An exemplary cooling system 100, such as a chiller or air conditioning system, generally includes in a cooling cycle 10 a compressor unit 12, a condenser unit 14 and an evaporator unit 16. Optionally there is also an expansion unit (not particularly illustrated), e.g., an expansion valve upstream of evaporator unit 16, which may be used for reducing pressure of the refrigerant in the cooling cycle 10.

As can be seen in the cooling cycle 10, compressor unit 12 compresses gaseous refrigerant which may be directed to condenser unit 14 to condense gaseous refrigerant into liquid refrigerant. Liquid refrigerant is then guided to evaporator unit 16 for evaporating liquid refrigerant to gaseous refrigerant, which is then transported back to compressor unit 12 for providing compressed gaseous refrigerant in a continuous cycle.

Compressor unit 12 itself comprises bearing assembly 2 with one or more rolling bearings. Bearing assembly 2 is schematically illustrated in FIGS. 1-2. Bearing assembly 2 may require lubrication during operation. In accordance with this disclosure, a cooling system, e.g., 100, uses refrigerant not only in cooling cycle 10, but also in lubrication cycle 20 for lubricating bearing assembly 2 using refrigerant as lubricant for bearing assembly 2.

As illustrated in FIG. 1, a portion of refrigerant is branched off from condenser unit 14 by a lubricating refrigerant supply line 22 and transported to bearing assembly 2 in compressor unit 12 thereby providing lubricating refrigerant to bearing assembly 2. Lubricating refrigerant is introduced into bearing assembly 2, usually under relatively high-pressure through a nozzle 60 or injection device (not particularly illustrated), and exits compressor unit 12 via lubricating refrigerant feedback line 24 for feeding back lubricating refrigerant to the evaporator unit 16.

Since a first pressure level of condenser unit 14 is much higher than a second pressure level of evaporator unit 16, there is no need for an additional lubricating refrigerant propelling unit, such as a pump, for transporting lubricating refrigerant through lubrication cycle 20. In order to prevent reflux of lubricating refrigerant to condenser unit 12, a check valve 26 is disposed within lubricating refrigerant supply line 22 upstream of compressor unit 12, as illustrated in FIG. 1.

Because refrigerant is used as refrigerant in cooling cycle 10 (as well as lubricant in lubricating cycle 20), refrigerant is exposed to several mechanical components (e.g., compressor, condenser, evaporator, connecting lines) and thus exposed to heat and pressure, as well as to liquid and/or gaseous contaminants (e.g., air and moisture), which may cause molecules in a refrigerant to break down and produce byproduct compounds that are harmful to bearing assembly 2 used in compressor unit 12. Additionally, the breakdown of molecules may even be caused by an inherent chemical instability of a refrigerant itself, depending on the refrigerant chosen. Furthermore, particles, e.g., originating from wear or abrasion of mechanical components, may be present in refrigerant and which may be harmful for bearing assembly 2 when such refrigerant is used as lubricant. Such byproducts and/or particles may be very harmful to a refrigerant lubricated bearing assembly as they may lead to corrosion, increased wear, insufficient lubrication conditions, or otherwise cause damage in a bearing assembly, e.g., bearing assembly 2.

Consequently, there may be an arrangement of filter units 34, 36, and 38, or an arrangement of individual and combined filter units 35, 38 arranged in the lubricating refrigerant supply line 22 upstream of the bearing assembly 2. The filter unit(s) 34, 35, 36, 38 contain materials that may absorb or react with the byproducts, contaminants and/or particles, thereby removing particles, acids, or water and the like from refrigerant within cooling system 100.

Filter units, e.g., 34, 35, 36, 38, may adsorb, catch, or trap certain molecules from refrigerant by mechanical, chemical, and/or physical adsorption, depending on filter material type, surrounding environment composition, or an expected type of contaminant.

As discussed above, it is possible to combine some or all filter units for reducing overall component size and according a required space, or to use synergistic effects. For example, as illustrated in FIG. 2, exemplary filter unit 35 is a combination of an acid filter and a desiccant filter. This is particularly useful as some reaction products of acids are competitive to adsorption of water/moisture, or as mentioned above a reaction product of a chemical reaction may be water, which should be removed from cooling system, e.g., 100, refrigerant.

As illustrated in FIGS. 1 and 2, an accumulator 40 may be arranged in lubricating refrigerant supply line 22. Accumulator 40 is configured to ensure that a constant lubricating refrigerant supply is provided at compressor unit 12 even if pressure in supply line 22 fluctuates. Consequently, accumulator 40 works as auxiliary reservoir for pressurized refrigerant, which may be fed to bearing assembly 2 if insufficient lubricating refrigerant supply is present in lubricating refrigerant supply line 22.

Accumulator 40 usually has two compartments 42, 44, wherein top compartment 42 is filled with a gas or may contain a spring, which is adapted to provide a preload/load 46 onto a piston or bladder 48, which separates compartments 42, 44. Second compartment 44 is used for storing pressurize refrigerant. Such an accumulator 40 works as follows: at a start of a lubrication cycle, second compartment 44 of accumulator 40 is empty. As pressure builds up, second compartment 44 starts to fill up with liquid refrigerant. Pressure is balanced by pressure 46 of a compressed gas in first compartment 42 or by compression of a spring, if used. At steady state operation compartments 42, 44 each have approximately a same volume. This is controlled by selection of gas pressure or spring force 46 in first compartment 42.

A volume of pressurized liquid refrigerant in second compartment 44 serves as reserve lubricant in case of malfunction of a system, e.g., 100, for any reason, e.g., in a case of an unexpected pressure drop.

Lubricating refrigerant supply branch 22 may be branched off of a condenser unit, e.g., 14, as explained above, or may alternatively or in addition be branched off from an optional economizer unit. In case an economizer unit is present in the cooling cycle, it may be preferred to use refrigerant from an economizer with a lower pressure differential to an evaporator pressure level in order to lubricate a bearing assembly, e.g., 2. Thus, a choice of refrigerant type, low or medium pressure, the number of compressor stages and using or not using an economizer are economic considerations. The use of an economizer unit is particularly advantageous in case compressor unit 10 is a high-speed compressor which provides very high pressure to refrigerant which might be too high for lubricating bearing assembly 2. In such a case a pressure difference between an economizer and an evaporator unit can be configured to remain high enough for transporting refrigerant through lubricating cycle 20 and provide sufficient refrigerant at bearing assembly 2 for lubricating.

FIG. 2 illustrates exemplary embodiments in accordance with this disclosure. In addition to a cooling system as illustrated in FIG. 1, a cooling system 100 as in FIG. 2 has a first lubricating refrigerant supply branch 22-1, which branches off from condenser unit 14 or an economizer unit (not particularly illustrated), and a second lubricating refrigerant supply branch 22-2 which branches off from evaporator unit 16. First and second lubricating refrigerant branches 22-1, 22-2 merge into a main lubricating refrigerant supply line 23. Second lubricating refrigerant supply branch 22-2 may be used at startup for providing a liquid refrigerant to compressor unit 12 even before compressor unit 12 starts operating. A pump unit 50 may be arranged in second refrigerant supply line 22-2 which transports liquid refrigerant from evaporator 16 to compressor unit 12. Since pump 50 is only operated during startup, energy consumption of cooling system 100 is not unduly increased relative to known systems with a constantly operating pump. Additionally, pump size may be reduced as only a small amount of refrigerant needs to be transported to compressor unit 12 in a pre-lubrication cycle. In order to avoid any reflux of refrigerant to evaporator unit 16, particularly during ordinary operation of a cooling system, e.g., 100, a further check valve 28 is arranged in second lubricating refrigerant supply line 22-2.

Pump unit 50 may be a positive displacement pump and may also be used to control flow during ordinary operation, e.g., in case a pressure difference is fluctuating or a pressure difference is too low or too high. Positive displacement pumps have a close correlation between rotational speed and flow rate and are less affected by a pressure difference than ordinary dynamic pumps. It is further possible that the pump unit is a so-called rotary vane pump, which has advantages over known pumps as a they may also be used for pumping a mixture of gaseous and liquid fluids, which may be present in evaporator 16.

A cooling system 100 in accordance with FIG. 2 embodiments works as follows.

At startup of a cooling system, liquid refrigerant for lubrication is available in evaporator unit 16. As system pressure is building up, liquid refrigerant becomes available in condenser unit 14. Lubricating refrigerant pump 50 is first pumping refrigerant from evaporator unit 16, then after condenser unit 14 and evaporator unit 16 have reach a first pressure difference level, the source of liquid refrigerant is switched to condenser unit 14. Downstream from pump 50, refrigerant is supplied to bearing assembly 2 for lubrication through a nozzle 60, then drains from bearing assembly 2 to evaporator unit 16 by feedback line 24. In high speed compressors 12, a nozzle 60 produces a jet that spays refrigerant into bearing assembly 2. Pressure drops through such a nozzle 60, which may be used to control refrigerant flow. In low speed compressors 12, jet injection may not be necessary, and refrigerant can flow into and through bearing assembly 2 without pressure drop. In such a case pump 50 may also function as a metering device.

In summary cooling systems in accordance with this disclosure have the following advantages:

Lubricating refrigerant flow is provided by a pressure difference between condenser unit, e.g. 12, and an evaporator unit, e.g., 16, instead of a pump. This reduces overall costs of a cooling system and increases overall reliability of the system.

Lubricating refrigerant flow has minimal variations due to use of an accumulator which ensures that lubrication of a bearing assembly, e.g., 2, is continuously provided. Additionally, interruptions of lubricating refrigerant flow are minimized and controlled. Since a pump is only used at startup (if at all) or if for any reason a pressure differential becomes too low, pump wear is minimized and additional power consumption is reduced. By using a rotary vane type pump internal leakage is minimized and pressure is created independently of speed. By using a variable speed drive for a pump, it is further possible to start such a pump at low speed for avoiding problems with cavitation, which usually occur when a mixture of liquid and gaseous fluids needs to be pumped. By not using the pump at steady-state conditions, overall energy consumption of the cooling system is reduced. By using a desiccant, acid and/or particle filter in the lubricating refrigerant flow, a bearing assembly's exposure to harmful substances which may corrode the bearing components is also minimized.

A first exemplary cooling system: A cooling system includes a refrigerant cycle for cycling refrigerant from at a compressor unit in order to compress gaseous refrigerant to a condenser unit for condensing gaseous refrigerant to liquid refrigerant, from the condenser unit to an evaporator unit for evaporating the liquid refrigerant to gaseous refrigerant, and from the evaporating unit back to the compressor unit, and a lubrication cycle having at least one lubricating refrigerant supply line for providing refrigerant as lubricant to a bearing assembly, and the at least one lubricating refrigerant supply line branches off from the refrigerant cycle at the condenser unit for providing refrigerant to the bearing assembly, and reunites with the refrigerant cycle at the evaporator unit, for feeding back refrigerant from the bearing assembly to the refrigerant cycle.

A second exemplary interrelated cooling system includes a refrigerant cycle for cycling refrigerant from at least a compressor unit for compressing gaseous refrigerant to a condenser unit for condensing gaseous refrigerant to liquid refrigerant, from the condenser unit to an economizer unit for lowering a pressure of the gaseous refrigerant, from the economizer unit to an evaporator unit for evaporating the liquid refrigerant to gaseous refrigerant, and from the evaporating unit back to the compressor unit, and a lubrication cycle having at least one lubricating refrigerant supply line for providing refrigerant as lubricant to a bearing assembly, and the at least one lubricating refrigerant supply line branches off from the refrigerant cycle at the economizer unit and/or at the compressor unit for providing refrigerant to the bearing assembly, and reunites with the refrigerant cycle at the evaporator unit, for feeding back refrigerant from the bearing assembly to the refrigerant cycle.

A third interrelated exemplary cooling system includes the lubricating refrigerant supply line terminating in at least one nozzle or refrigerant injection device, which is adapted to provide and direct lubricating refrigerant to the bearings assembly in the compressor unit.

A fourth interrelated exemplary cooling system includes the lubrication cycle has a first lubricating refrigerant supply branch branching off from the condenser unit or from the economizer unit, and a second lubricating refrigerant supply branch branching off from the evaporator unit, which are both adapted to supply refrigerant to the bearing assembly.

A fifth interrelated exemplary cooling system includes the first and the second lubricating refrigerant supply line branches merge to a single main lubricating refrigerant supply line upstream of the bearing assembly.

A sixth interrelated exemplary cooling system include a pump, which is arranged either in the second lubricating refrigerant supply line branch or in the main lubricating refrigerant supply line.

A seventh interrelated exemplary cooling system includes at least one filter unit is arranged in the lubricating refrigerant supply line upstream of the bearing assembly.

An eighth interrelated exemplary cooling system includes an accumulator is arranged in the lubricating refrigerant supply line upstream of the bearing assembly.

A ninth interrelated exemplary cooling system includes a method of operating a cooling system, wherein the refrigerant being used as lubricant is driven through the lubrication cycle line by a pressure difference between the condenser unit or economizer unit and the evaporator unit.

It will be appreciated that the interrelated exemplary embodiments above are non-limiting and only provided by way of example to ease a readers understanding of a variety of embodiments in accordance with this disclosure.

According to a preferred embodiment the cooling system operates as follows:

At startup of the cooling system, liquid refrigerant for lubrication is available in the evaporator. As the system pressure is building up, liquid refrigerant becomes available in the condenser. The lubricant pump is first pumping refrigerant from the evaporator, then after having reach a certain pressure difference level, the source of liquid refrigerant is switched to the condenser. Downstream from the pump, the refrigerant is supplied to the compressor bearings for lubrication through a nozzle, then drains from the bearing assembly to the evaporator. In high speed compressors, the nozzle produces a jet that spays refrigerant into the bearings. The pressure drops through the nozzle and the nozzle controls the flow. In low speed compressors, jet injection may not be necessary. The refrigerant can flow into the bearing housing without pressure drop, then through the bearings. In that case, it is also possible that the pump functions as a metering device.

The optional pump may be engaged at all times, but it is preferred to engage the pump only to pump refrigerant from the evaporator at startup, then to turn it off and to only use the pressure differential between the condenser (or economizer) and the evaporator to drive the lubricating refrigerant flow.

In order to keep a supply of pressurized refrigerant in reserve, in case of a pump malfunction, a hydraulic accumulator is be filled by refrigerant, when the pump is started, which should be in a pre-lubrication cycle, before the compressor is started.

A compressor unit may be a centrifugal compressor which includes one or more impellers that compress the refrigerant. The impellers are mounted on a rotating shaft which is supported by a plurality of bearings. The bearing assembly requires a steady supply of lubricant, which is often oil.

A pump can be used to drive the refrigerant flow to the bearings. However, a pump may cavitate making it more difficult to supply the refrigerant to the bearings. There can also be operating conditions under which a supply of refrigerant provided by a pump is insufficient or a state of refrigerant is a mixture of liquid and vapor so that bearings may not be lubricated, properly. Additionally, there is a general reliability problem as a flow of bearing lubricant stops, if a pump for some reason stops working. A common reason why a pump stops working is a loss of electric power. Moreover, a pump that is constantly engaged also wears and consumes power.

It is therefore an object of the present disclosure to provide a cooling system with refrigerant lubricated bearings, which is operating reliably, and is cost-efficient.

In accordance with this disclosure some embodiments include a cooling system includes a refrigerant cycle for cycling refrigerant from at least a compressor unit for compressing gaseous refrigerant to a condenser unit for condensing gaseous refrigerant to liquid refrigerant, from the condenser unit to an evaporator unit for evaporating liquid refrigerant to gaseous refrigerant, and from an evaporating unit back to a compressor unit. Such a cooling system further comprises a lubrication cycle having at least one lubricating refrigerant supply line for providing refrigerant as lubricant to a bearing assembly, which may be part of a compressor unit.

For providing a stable supply of lubricating refrigerant to a bearing assembly, in some embodiments at least one lubricating refrigerant supply line branches off from a refrigerant cycle at a condenser unit for providing refrigerant to a bearing assembly, and reunites with a refrigerant cycle at an evaporator unit, for feeding back refrigerant from a bearing assembly to a refrigerant cycle. Thereby, a pressure difference between a condenser unit and an evaporator unit may be used for transporting lubricating refrigerant in a lubricating cycle. A pressure difference results from a difference between a high pressure level of a compressor unit and a low pressure level of an evaporator unit. This transports refrigerant through a refrigerant cycle and also through a lubrication cycle.

According to a further aspect and/or a preferred embodiment, a refrigerant cycle may also comprise an economizer unit.

An economizer unit may be used in a cooling system in accordance with this disclosure in a two stage (or more generally multi stage) compressor. Thereby an expansion process is separated into two (or more) steps with an economizer in-between. Hence, liquid refrigerant from a condenser unit enters a first expansion device, which reduces a pressure of the refrigerant. This pressure drop causes a portion of liquid refrigerant to evaporate, and a resulting mixture of liquid and gaseous refrigerant enters an economizer unit. Consequently, a pressure in an economizer unit is between that of a condenser unit and an evaporator unit. An economizer unit itself is connected to a second expansion device and to an inlet to a second stage of a two stage compressor. In an economizer unit, a gaseous refrigerant is separated from a liquid refrigerant, and only remaining liquid refrigerant is fed to a second expansion device and further to an evaporator unit. A gaseous part of refrigerant in turn is recompressed by a second stage of such a compressor, and fed back from an outlet of a second stage compressor to a condenser unit. Since part of such refrigerant is already vaporized upstream of an evaporator, an amount of required compressor power is reduced as a gaseous part of such refrigerant generated in an economizer only needs to be compressed by the second stage impeller. In a system without an economizer, more gaseous refrigerant would be released and more gaseous refrigerant would be recompressed in-stead of being in liquid form and evaporate before going back to a first stage of a compressor. Thus, by using an economizer unit, a system efficiency is increased (by 4% to 6%), as recompression of gaseous refrigerant is waste of energy.

In embodiments, where an economizer unit is present, there is an additional or alternative possibility to branch off a lubricating supply line from a compressor unit or from an economizer unit. Using an economizer as branch off for a lubricating refrigerant supply line allows for a slower movement of refrigerant in a lubrication cycle and thereby for a more controlled distribution of refrigerant to a bearing assembly. It also reduces a speed with which refrigerant is introduced or sprayed into a bearing assembly.

A lubricating refrigerant supply line may terminate in a nozzle or injection device for directing and introducing refrigerant to a bearing assembly. A nozzle or injection device allows for an optimized and guided provision of lubricating refrigerant to a bearing assembly, and thereby for an improved lubrication. Further, it is preferred that a supply line itself is designed such that pressure drops across a nozzle rather than throughout a supply line.

According to a further preferred embodiment, the lubrication cycle has a first lubricating refrigerant supply line branch branching off from the condenser unit and/or from an economizer unit, and a second lubricating refrigerant supply line branch branching off from an evaporator unit, wherein both branches are adapted to supply refrigerant to a bearing assembly. The use of refrigerant from an evaporator unit is preferred at startup of a cooling system. At a startup phase, refrigerant in an evaporator is liquid and can be used for lubricating bearings before a compressor is started, while there is no liquid refrigerant in a condenser unit, which could be used for lubricating the bearing assembly. Using refrigerant from an evaporator unit allows for a so-called pre-lubrication cycle during which refrigerant is provided to the bearing assembly before the compressor unit start operating. This in turn ensures a sufficient lubrication of a bearing assembly at all times. Thereby, a service life of a compressor unit may be prolonged. On will appreciate that more than two branches may be provided.

A second branch-off from an evaporator a pump is arranged, which may be operated at start up and provides liquid refrigerant to a bearing assembly of a compressor unit before operating a compressor unit. Use of a pump ensures that sufficient refrigerant is provided at a bearing assembly at start up and also in case a pressure difference has not been built up or drops during ordinary operation. Preferably, a pump is controlled such that it starts if a pressure differential between a condenser and/or economizer becomes less than a predetermined value. To avoid or minimize the risk of cavitation in a pump suction line, a pump speed may be controlled for slow start and/or variable speed.

A pump may be disposed in a main lubrication supply line, which is provided by a merging of a first and second branch supply lines upstream of a bearing assembly. A pump is preferably operated at start up only, or in order to drive a lubricating refrigerant in case of an unexpected drop in pressure difference. However, arranging a pump in a main supply line might increase a flow resistance in a lubrication supply line, as refrigerant has also to pass a pump.

According to a further preferred embodiment, the cooling system further comprises a filter unit which is arranged in the lubricating refrigerant supply line upstream of the bearing assembly. Thereby, a filter unit may be arranged in a main supply line and/or in one or both branches depending design considerations. This filter unit ensures that harmful substances, e.g. water and/or other substances, which may occur due to a breakdown of molecules of a refrigerant due to heat, pressure and/or mechanical abrasion, are filtered out of refrigerant so that refrigerant which is used for lubricating a bearing assembly is not contaminated. Advantageously, a filter comprises at least one unit for filtering out liquids, such as water and acids, and a second for filtering out contaminate particles.

An accumulator may be arranged in a lubrication cycle line upstream of a bearing assembly. An accumulator is preferably filled up with refrigerant at start-up and ensures that a continuous lubrication is provided at a bearing assembly even during pressure difference variations between a pressure level of a compressor unit/economizer unit and an evaporator unit. An accumulator may also serve as pressurized lubrication refrigerant reservoir at start-up instead of a pump or in case the pump is not working. Consequently, an accumulator is preferably adapted to operate in a pre-lubrication cycle, before a compressor is started.

Preferably, an accumulator has two compartments, one on top that is filled with a gas or may contain a spring, a second that is used for storing pressurize refrigerant. Two compartments are separated by a piston or a rubber bladder.

An exemplary accumulator works as follows: at start of a relubrication cycle, a second compartment of an accumulator is empty. As pressure builds up, a second compartment starts to fill up with liquid refrigerant. A pressure is balanced by a pressure of a compressed gas in a first compartment or by a compression of the spring, if used. At steady state operation two compartments have approximately a same volume. This is controlled by selection of gas pressure or spring force in a first compartment.

As mentioned above, a volume of pressurized liquid refrigerant in a second compartments serves as reserve lubricant in case of malfunction of a system for any reason.

In an exemplary method for operating a cooling system, a refrigerant being used as lubricant is driven through a lubrication cycle line by a pressure difference between a condenser or economizer and the evaporator.

Further preferred embodiments are defined in the dependent claims as well as in the description and the figures. Thereby, elements described or shown in combination with other elements may be present alone or in combination with other elements without departing from the scope of protection.

REFERENCE NUMERALS

100 Cooling system
10 Cooling cycle
12 compressor unit
14 condenser unit
16 evaporator unit
20 lubrication cycle
22 lubricating refrigerant supply line
22-1 first lubricating refrigerant supply line
22-2 second lubricating refrigerant supply line
23 main lubricating refrigerant supply line
24 lubricating refrigerant feedback line
26 check valve
28 check valve
34 first filter unit
36 second filter unit
35 combined filter unit
38 third filter unit
40 accumulator
42 first compartment
44 second compartment
46 spring force/gas pressure
48 piston/bladder
50 pump.

We claim:

1. A cooling system comprising
a refrigerant cycle for cycling refrigerant from a compressor to a condenser, from the condenser to an evaporator, and from the evaporator back to the compressor,
and a lubrication cycle having at least one lubricating refrigerant supply line for providing refrigerant as lubricant to a bearing assembly,
wherein the at least one lubricating refrigerant supply line branches off from the refrigerant cycle at the condenser for providing refrigerant to the bearing assembly and reunites with the refrigerant cycle at the evaporator, for feeding back refrigerant from the bearing assembly to the refrigerant cycle; wherein the lubrication cycle further comprises: a first lubricating refrigerant supply branch branching off from the condenser and a second lubricating refrigerant supply branch branching off from the evaporator, and
wherein the first and the second lubricating refrigerant supply line branches merge to a single main lubricating refrigerant supply line upstream of the bearing assembly at a merge point, and
an accumulator in the main lubricating refrigerant supply line between the condenser unit and the compressor unit downstream of the merge point, the accumulator comprising a first compartment and a second compartment, the first compartment being filled with either gas or a spring, and the second compartment configured to hold the liquid refrigerant which is balanced by either compression of the gas or compression of the spring in the first compartment, wherein the liquid refrigerant in the second compartment is configured to serve as a reserve lubricant for the bearing assembly.

2. The cooling system of claim 1, wherein the lubricating refrigerant supply line terminates in at least one nozzle, which is configured to provide and direct lubricating refrigerant to the bearings assembly in the compressor.

3. The cooling system of claim 1, further comprising a pump, which is arranged either in the second lubricating refrigerant supply line branch or in the main lubricating refrigerant supply line.

4. A cooling system comprising
a refrigerant cycle including a compressor, a condenser, and an evaporator; and
a lubrication cycle having at least one lubricating refrigerant supply line for providing refrigerant as lubricant to a bearing assembly,
wherein the at least one lubricating refrigerant supply line branches off from the refrigerant cycle at the condenser for providing refrigerant to the bearing assembly and reunites with the refrigerant cycle at the evaporator, for feeding back refrigerant from the bearing assembly to the refrigerant cycle,
wherein the lubrication cycle further comprises: a first lubricating refrigerant supply branch branching off from the condenser, a second lubricating refrigerant supply branch branching off from the evaporator,
wherein the first and the second lubricating refrigerant supply line branches merge to a single main lubricating refrigerant supply line upstream of the bearing assembly at a merge point,
wherein an accumulator is arranged in the single main lubricating refrigerant supply line downstream of the merge point and upstream of the bearing assembly, and
wherein at least one filter is arranged in the single main lubricating refrigerant supply line downstream of the merge point and upstream of the accumulator.

5. The cooling system of claim 4, wherein the lubricating refrigerant supply line terminates in at least one nozzle, which is configured to provide and direct lubricating refrigerant to the bearing assembly in the compressor.

6. The cooling system of claim 5, further comprising a pump, which is arranged either in the second lubricating refrigerant supply line branch or in the main lubricating refrigerant supply line.

7. The cooling system of claim 4, wherein the accumulator further comprises a first compartment and a second compartment, the first compartment being filled with either gas or a spring, and the second compartment configured to hold the liquid refrigerant which is balanced by either compression of the gas or compression of the spring in the first compartment, wherein the liquid refrigerant in the second compartment is configured to serve as a reserve lubricant for the bearing assembly.

8. The cooling system of claim 7, wherein the at least one filter is arranged in the lubricating refrigerant supply line upstream of the bearing assembly.

9. A method of operating a cooling system comprising:
drawing refrigerant from a refrigerant cycle including at least an evaporator and a condenser;

driving refrigerant through at least one lubricating refrigerant supply line by a pressure difference between the evaporator and the condenser; and lubricating a bearing assembly using refrigerant, wherein the at least one lubricating refrigerant supply line branches off from the refrigerant cycle at the condenser for providing refrigerant to the bearing assembly and reunites with the refrigerant cycle at the evaporator for feeding back refrigerant from the bearing assembly to the refrigerant cycle, wherein the lubrication cycle comprises: a first lubricating refrigerant supply branch branching off from the condenser; a second lubricating refrigerant supply branch branching off from the evaporator, wherein the first and the second lubricating refrigerant supply line branches merge to a single main lubricating refrigerant supply line upstream of the bearing assembly at a merge point, and wherein an accumulator is disposed in the at least one lubricating refrigerant supply line between the condenser unit and the compressor unit downstream of the merge point, the accumulator comprising a first compartment and a second compartment, the first compartment being filled with either gas or a spring, and the second compartment configured to hold the liquid refrigerant which is balanced by either compression of the gas or compression of the spring in the first compartment, wherein the liquid refrigerant in the second compartment is configured to serve as a reserve lubricant for the bearing assembly.

* * * * *